(12) United States Patent
Malacarne

(10) Patent No.: US 12,439,541 B2
(45) Date of Patent: Oct. 7, 2025

(54) SEALED ELECTRONIC MODULE

(71) Applicant: EM Microelectronic-Marin SA, Marin (CH)

(72) Inventor: Fabien Malacarne, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 91 days.

(21) Appl. No.: 18/461,817

(22) Filed: Sep. 6, 2023

(65) Prior Publication Data

US 2024/0098924 A1 Mar. 21, 2024

(30) Foreign Application Priority Data

Sep. 15, 2022 (EP) ..................... 22195890

(51) Int. Cl.
| | | |
|---|---|---|
| *H05K 5/06* | (2006.01) |
| *G06K 19/077* | (2006.01) |
| *H01H 9/16* | (2006.01) |
| *H01H 13/06* | (2006.01) |
| *H01H 13/48* | (2006.01) |
| *H05K 5/00* | (2025.01) |

(52) U.S. Cl.
CPC .......... *H05K 5/066* (2013.01); *G06K 19/077* (2013.01); *H01H 9/167* (2013.01); *H01H 13/06* (2013.01); *H01H 13/48* (2013.01); *H05K 5/0069* (2013.01); *H05K 5/069* (2013.01); *H01H 2205/016* (2013.01); *H01H 2215/036* (2013.01); *H01H 2223/002* (2013.01); *H01H 2300/032* (2013.01)

(58) Field of Classification Search
CPC ............. H01H 13/06; H01H 2223/002; H01H 2300/032; H01H 9/167; H01H 2300/03; H01H 13/48; H01H 2205/016; H01H 2215/036; H05K 5/066; H05K 5/069; H05K 5/0069; H05K 5/06; G06K 19/077
See application file for complete search history.

(56) References Cited

U.S. PATENT DOCUMENTS

| | | | | |
|---|---|---|---|---|
| 6,344,622 B1* | 2/2002 | Takiguchi | .............. | H01H 13/70 200/314 |
| 6,984,797 B2* | 1/2006 | Morita | ................... | H01H 3/122 200/344 |
| 7,355,137 B2* | 4/2008 | Kawasaki | ............... | H04M 1/18 200/302.1 |
| 8,059,418 B2* | 11/2011 | Blake, III | ........... | B29C 66/5414 361/752 |
| 8,237,072 B2* | 8/2012 | Kubota | .................. | H01H 13/14 200/341 |

(Continued)

OTHER PUBLICATIONS

European Search Report for EP 22195890 dated Feb. 13, 2023.

*Primary Examiner* — Allen L Parker
*Assistant Examiner* — Martin Antonio Asmat Uceda
(74) *Attorney, Agent, or Firm* — Sughrue Mion, PLLC

(57) ABSTRACT

A sealed electronic module (1) including at least one actionable part (2), the module (1) including a case (2) having: a watertight compartment (4) containing a printed circuit board (5), the compartment (4) being formed by a housing (13) with a unique opening (20), the housing (13) including the printed circuit board (5), and a sealing element (6a, 6b) configured for closing tightly the unique opening (20) by being fixed to the housing (13) and the printed circuit board (5).

11 Claims, 6 Drawing Sheets

(56) References Cited

U.S. PATENT DOCUMENTS

| | | | |
|---|---|---|---|
| 8,497,440 B2* | 7/2013 | Kitahara | H01H 13/06 |
| | | | 200/302.2 |
| 8,575,506 B2* | 11/2013 | Kitahara | H01H 13/06 |
| | | | 200/341 |
| 8,729,414 B2* | 5/2014 | Mittleman | H04M 1/23 |
| | | | 200/516 |
| 8,822,863 B2* | 9/2014 | Tittle | H01H 13/06 |
| | | | 200/534 |
| 9,041,512 B2* | 5/2015 | Nakabayashi | G08C 17/02 |
| | | | 455/90.3 |
| 9,272,471 B2* | 3/2016 | Colahan | H04R 1/1041 |
| 9,660,324 B2* | 5/2017 | Baringer | H04W 4/027 |
| 10,727,891 B2* | 7/2020 | Ota | H05K 5/04 |
| 11,171,369 B1* | 11/2021 | Olsson | H01M 50/287 |
| 11,250,999 B2* | 2/2022 | Sagong | H01H 1/58 |
| 11,259,430 B2* | 2/2022 | Liu | H05K 5/069 |
| 11,324,135 B2* | 5/2022 | Kim | H05K 1/0281 |
| 11,672,101 B2* | 6/2023 | Dawkins | H05K 7/20336 |
| | | | 361/710 |
| 11,688,567 B2* | 6/2023 | Fernandez Reina | |
| | | | H05K 7/1427 |
| | | | 200/341 |
| 11,704,529 B2* | 7/2023 | Samardzija | H01Q 5/50 |
| | | | 340/572.8 |
| 12,142,449 B2* | 11/2024 | Buschmann | G05G 5/05 |
| 2004/0140898 A1 | 7/2004 | Reeves | |
| 2005/0200490 A1 | 9/2005 | Teller | |
| 2011/0287688 A1 | 11/2011 | Hang et al. | |
| 2013/0037397 A1 | 2/2013 | Tittle | |
| 2019/0113953 A1* | 4/2019 | Sutherland | H05K 5/0034 |
| 2022/0102089 A1 | 3/2022 | Jimenez Pavon et al. | |
| 2022/0254581 A1 | 8/2022 | Fernandez Reina et al. | |
| 2024/0089358 A1* | 3/2024 | Li | G06F 1/1688 |

* cited by examiner

SEALED ELECTRONIC MODULE

CROSS-REFERENCE TO RELATED APPLICATIONS

This application claims priority to European Patent Application No. 22195890.3 filed Sep. 15, 2022, the entire contents of which are incorporated herein by reference.

FIELD OF THE INVENTION

The present invention relates to a sealed electronic module, notably to a sealed electronic communication module, comprising a watertight compartment containing a printed circuit board being able to implement RFID (acronym for Radio Frequency IDentification), NFC (acronym for Near Field Communication) and/or Bluetooth technologies.

BACKGROUND OF THE INVENTION

In the prior art, a small number of electronic communication modules available on the market already have actionable parts, such as push-button switches, in order to stop or start these modules and/or to select a function implemented in these modules. However, the push-button switches used in these modules are not waterproof switches and thus are not effective for waterproofing.

Although other electronic modules implemented for example in professional flashlights, which are not communication modules, have waterproof push-button switches, their functions are simple and a degree of integration is low. Moreover, for these modules, a high complexity and a unique performance of communication components such as Radio Frequency (RF), audio and antenna are not taken into account. Thus, the design scheme of the waterproof push-button switch of these modules is very different from that of the electronic communication modules and cannot be used in these last ones.

In light of this, there is a need to develop a solution making it possible to overcome the drawbacks of the state of the art.

SUMMARY OF THE INVENTION

In this context, embodiments of the present disclosure provide an electronic module with a switch comprising a watertight compartment containing a printed circuit board, this module being compact and has low manufacturing costs.

To this end, the invention relates to a sealed electronic module comprising at least one actionable part, the module including a case comprising:
  a watertight compartment containing a printed circuit board, the said compartment being formed by a housing with a unique opening, the housing comprising the printed circuit board, and
  a sealing element configured for closing tightly this unique opening by being fixed to the housing and the printed circuit board.
In other embodiments:
  the watertight compartment is mainly formed by the assembly of the housing with the sealing element;
  the housing comprises an enclosure delimited by its bottom, its peripheral inner wall and a surface of an area delimited by the opening;
  the housing includes ribbings comprised on a surface of its peripheral inner wall;
  the housing includes ribbings extending on the surface of the peripheral inner wall from its bottom to its opening;
  the extension of the ribbings is configured to support the printed circuit board in the enclosure;
  the extension of the ribbings is configured to arrange in the enclosure a peripheral part of a backside face of the printed circuit board in a same plan plane than a part of a surface of an edge of the opening;
  at least one actionable part is formed by a metal dome switch arranged in the printed circuit board and a part of the sealing element covering this metal dome switch;
  the sealing element comprises an adhesive on all or part of its internal face;
  the sealing element comprises an internal face pasted to the surface of the edge of opening and the backside face of the printed circuit board;
  the sealing element is single-sided adhesive tape, and
  the electronic module is a sealed electronic communication module notably capable of implementing wireless communication technologies like for example RFID, NFC and/or Bluetooth technology.
The invention also relates to an electronic device comprising this electronic module.

BRIEF DESCRIPTION OF THE DRAWINGS

The present invention will be described subsequently in more detail with reference to the attached drawing, given by way of examples, but in no way limited thereto, in which.

DETAILED DESCRIPTION OF THE INVENTION

Figure 1:
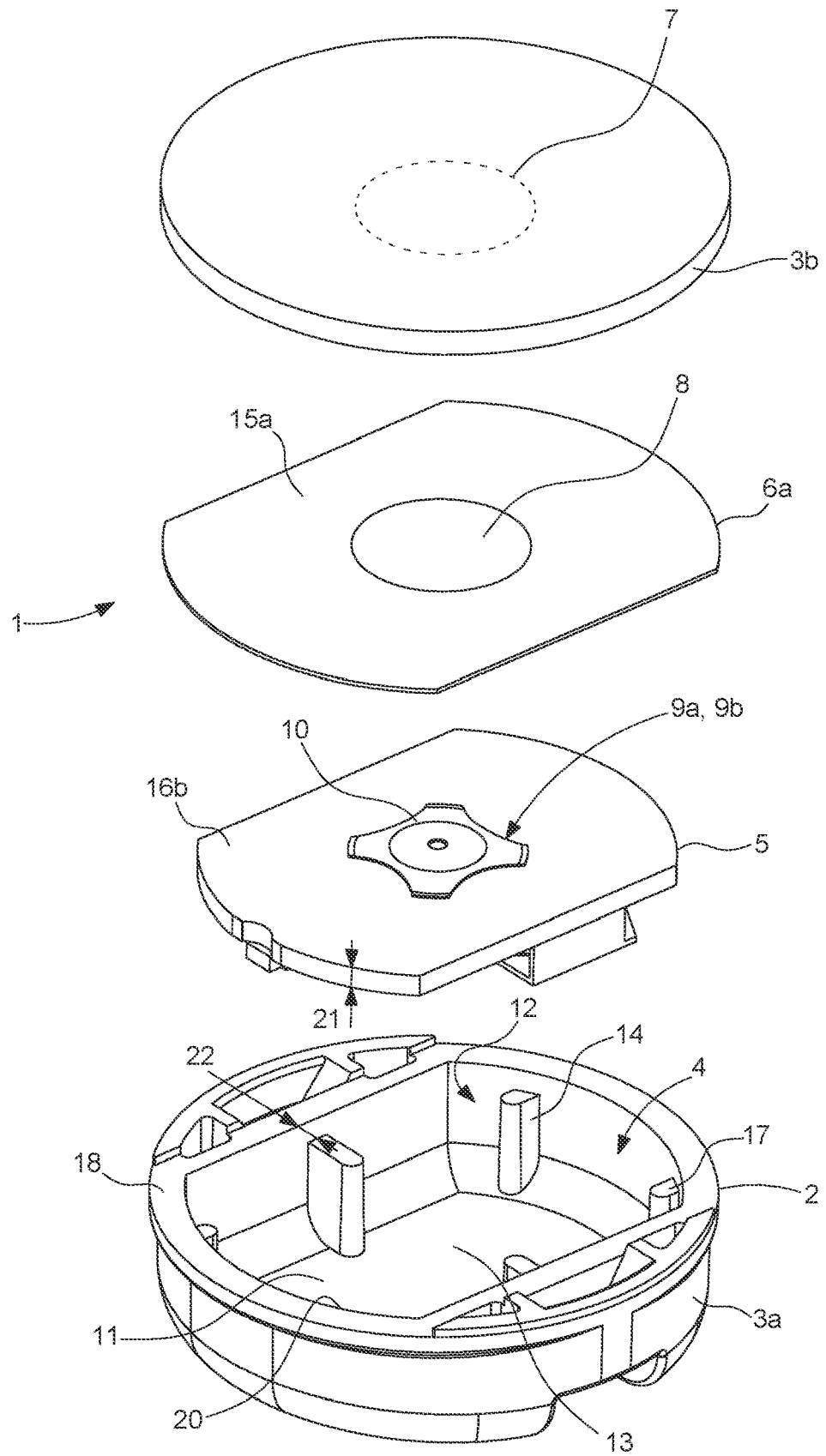
FIGS. 1 and 2 are tow exploded perspective views of a sealed electronic module according to the present invention.
Figure 2:
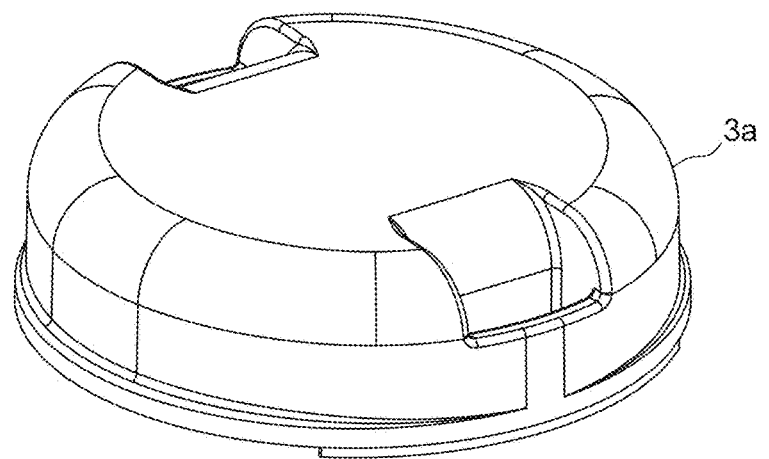
Figure 2:
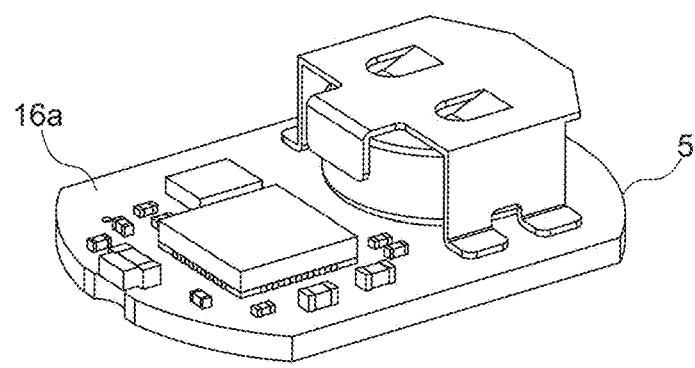
Figure 2:
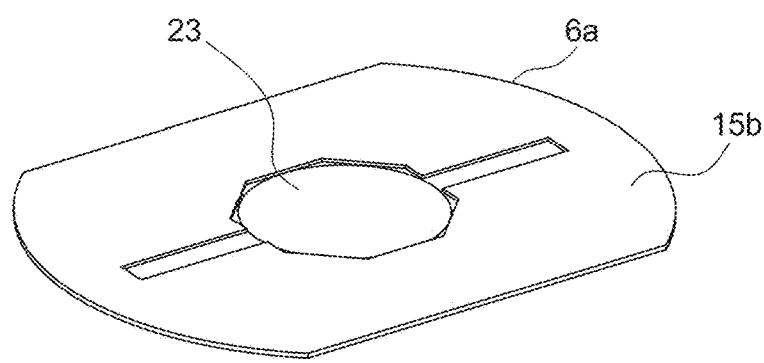
Figure 2:
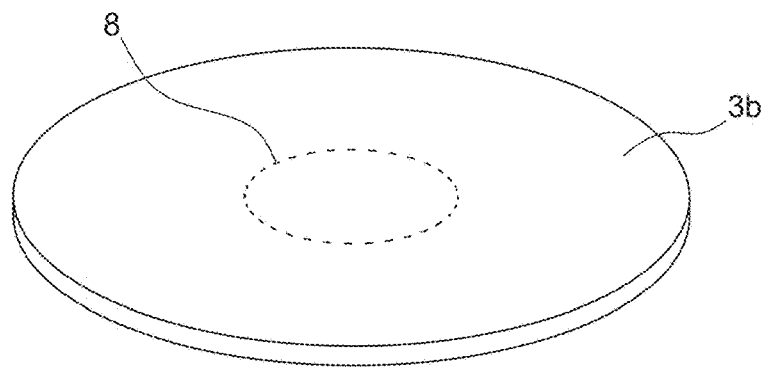
Figure 3:
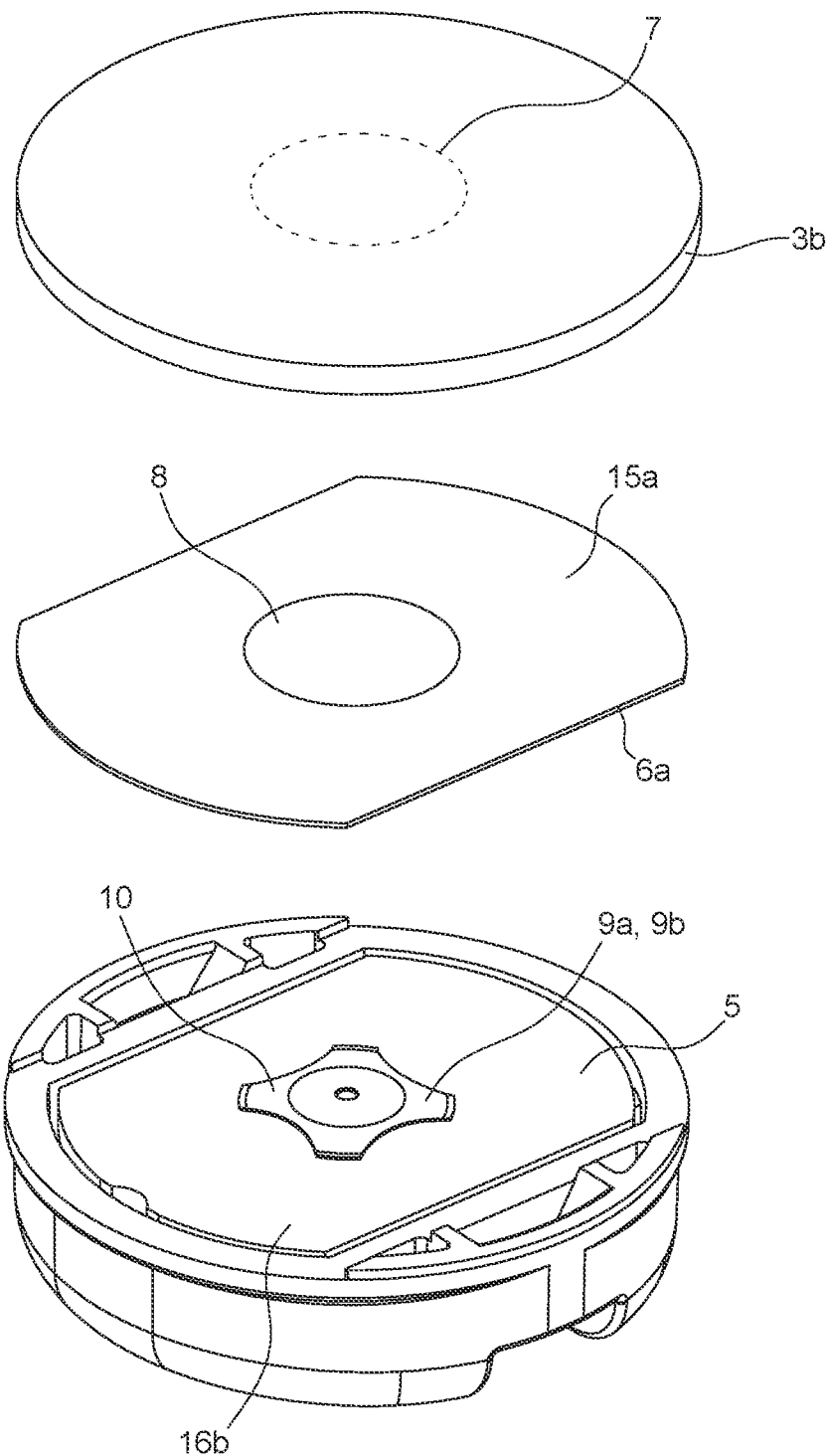
FIG. 3 is a perspective view of the sealed electronic module with a printed circuit board comprising a metal dome switch, the board being arranged in a housing of this module before closing of this housing by a sealing element according to the present invention.
Figure 4:
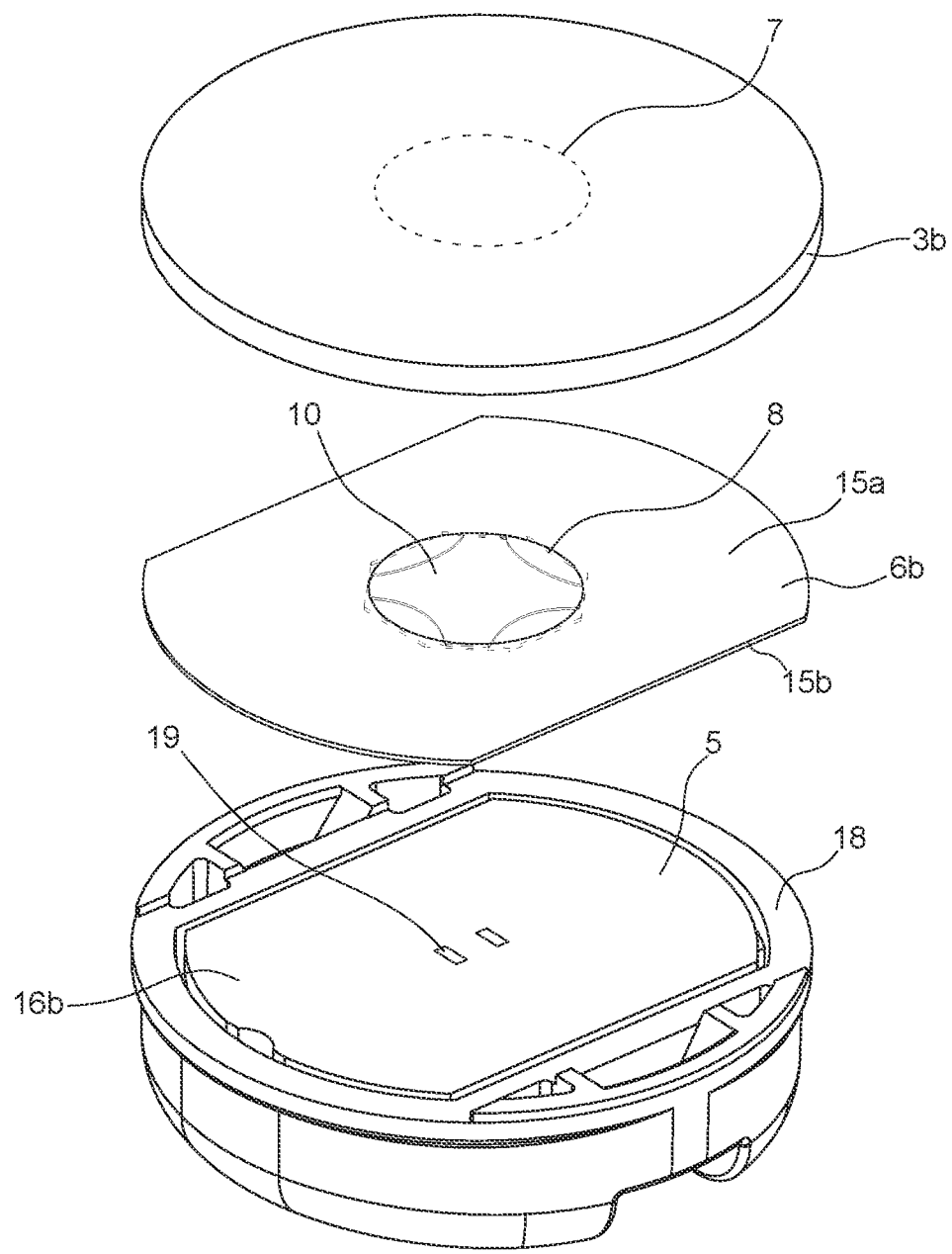
FIG. 4 is a perspective view of the sealed electronic module with the printed circuit board arranged in an housing of this module before closing of this housing by a sealing element comprising a metal dome switch according to the present invention.
Figure 5:
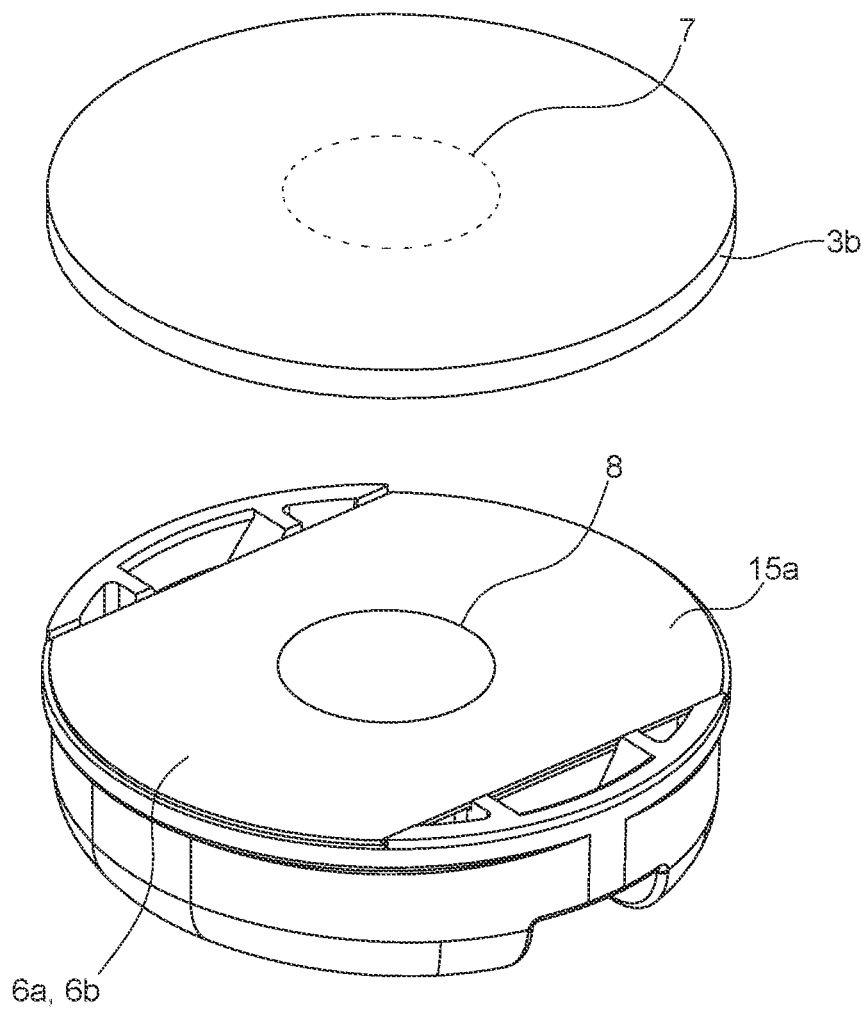
FIG. 5 is a perspective view of the assembled sealed electronic module according to the present invention.

Throughout and claims, the following terms take the meanings explicitly associated herein, unless the context clearly dictates otherwise. The meaning of "a," "an," and "the" includes plural reference, the meaning of "in" includes "in" and "on." The term "circuit" means either a single component or a multiplicity of components, either active or passive, that are connected together to provide a desired function.

Additionally, directional terms such as "on", "over", "top", "bottom", "left", "right", "upper", "below" are used with reference to the orientation of the Figure(s) being described. Because components of embodiments of the present invention can be positioned in a number of different orientations, the directional terminology is used for purposes of illustration only and is in no way limiting.

In the different embodiments of the invention illustrated in the FIGS. 1 to 5, a sealed electronic module 1 comprising at least one actionable part is described. This module 1 can be also called a sealed electronic communication module 1 because it is able to implement wireless communication technologies like for example RFID, NFC and/or Bluetooth technology.

In particular, this sealed electronic module 1 can be configured to be implemented in an electronic device that can be worn by a living being. More specifically this electronic module 1 can be used in particular for wearable and disposable Bluetooth/NFC devices for people or asset tracking applications. This electronic module 1 can be, for instance, implemented in a wearable device such as activity tracker or another object that is part of the Internet of Things.

In this sealed electronic module 1, the actionable part is reachable or comprised or defined on an external face of a case 2 of this module 1, more particularly on an external face of one of the two parts 3a, 3b constituting this case 2. In this configuration, such actionable part make it possible to activate for example this module 1 that is to say start or stop it, and/or make it possible to select a function of this module 1 for example a tracking function.

As we mentioned before, this electronic module 1 includes the case 2 formed by the two parts 3a, 3b discussed before: first and second parts 3a, 3b. This case 2 is defined to include a watertight compartment 4 configured to contain a printed circuit board 5. This watertight compartment 4 comprises notably a sealing element 6a, 6b containing external and internal faces 15a, 15b. The first part 3a is in one-piece and can be called "first monobloc part 3a". Such first part 3a comprises a housing 13 including an enclosure 11. This housing 13, and therefore this enclosure 11, includes a sole opening 20.

In this configuration, that second part 3b can be:
a complementary element 3b to the first part 3a having a structure or a shape complementary to that of this first part 3a, or
the sealing element 6a, 6b which is a part of this watertight compartment 4.

It can be noted that this complementary element 3b of this case 2, is configured to define a closed internal volume of an enclosure of this module 1 by being fixed/assembled with/to this first part 3a. Such an internal volume comprises the watertight compartment 4.

This printed circuit board 5 well known by the acronym PCB and also called PWB for Printed Wiring Board is a laminated sandwich structure of conductive and insulating layers. More specifically, the printed circuit board 5 includes a substrate comprising a backside face 16b and a front face 16a, and also a circuit.

Such a circuit includes electronic components and reliable electrical connections between the terminals of these components in a controlled manner. These electronic components are affixed in designated locations on the outer layers of the substrate forming the front face 16a by means of soldering. This circuit also comprises a battery and at least one switch 9a, 9b used as push button switch 9a, 9b. As discussed before, this circuit can be configured to realise tracking functions. Moreover, this circuit can implement RFID, NFC and/or Bluetooth technologies.

In this circuit, this switch 9a, 9b can be a metal dome switch 9a, 9b formed notably by a metal dome 10 and conductive tracks 19 comprised on the backside face 16b of the substrate. The metal dome 10 is arranged in this circuit in order to cooperate with the conductive tracks 19 particularly when the switch 9a, 9b is operated.

Figure 6A:
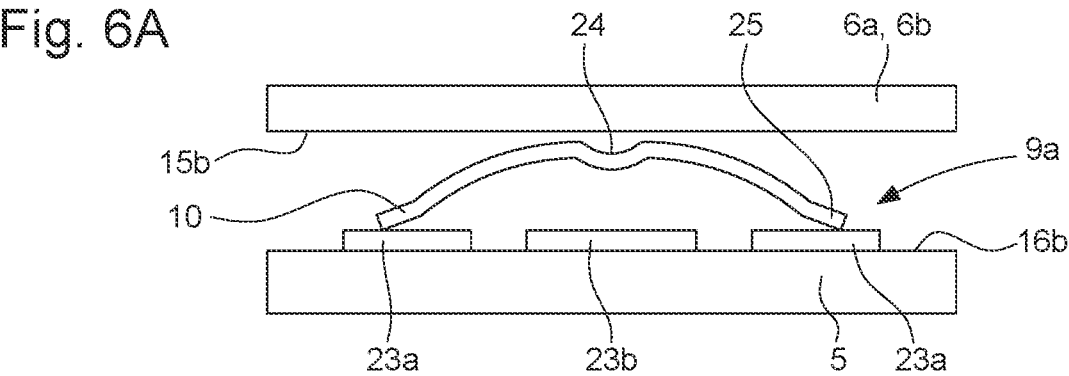
FIGS. 6A, 6B, 7A and 7B are schematic views of different embodiments of the metal dome switch comprised in the electronic module, according to the present invention.
Figure 6B:
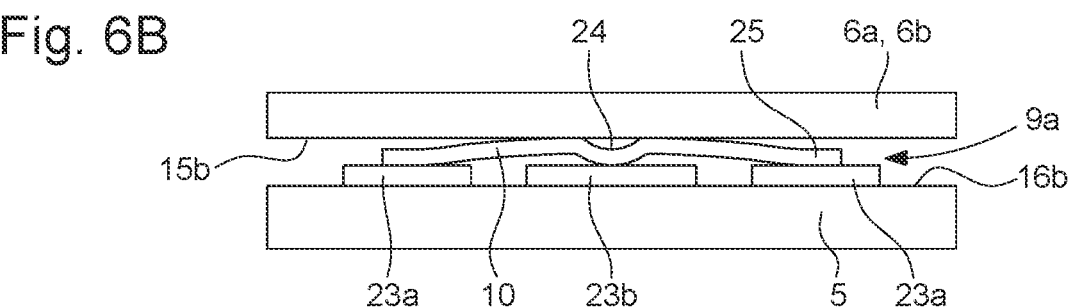

According to FIGS. 6A and 6B, the metal dome switch 9a can be tactile. This tactile metal dome switch 9a is a momentary switch designed to provide a tactile response when the actionable part of the module 1 is pressed/operated to be activated. In other words, that tactile switch 9a is a momentary switch 9a as it will only work when it is physically held down or pressed via this actionable part. Once pressure is released, this switch 9a will disconnect, and the action will stop. In the electronic module 1, there is an overlay on the top of the switch 9a that sits above the metal dome 10. More particularly, the metal dome 10 is covered by a contact portion 8 of the sealing element 6a of this module 1. In this switch 9a, the metal dome 10 comprises a peripheral portion 25 soldered to first conductive tracks 23a. In this configuration, when the actionable part is pressed down, the metal dome 10 changes from a state of rest to a state of constraint during which its center 24 is connected with a second conductive track 23b in order to activate/deactivate the module 1. When the pressure on the actionable part is released, the metal dome 10 is disconnected from this second conductive track 23b by returning to its state of rest.

In an alternative of this tactile metal dome switch 9a, the metal dome 10 is not soldered to first conductive tracks 23a. More specifically this tactile metal dome 10 is connected to these first conductive tracks 23a when the sealing element 6b of the module 1 on which this metal dome 10 is already fixed, covers the backside face 16b of the substrate.

Figure 7A:
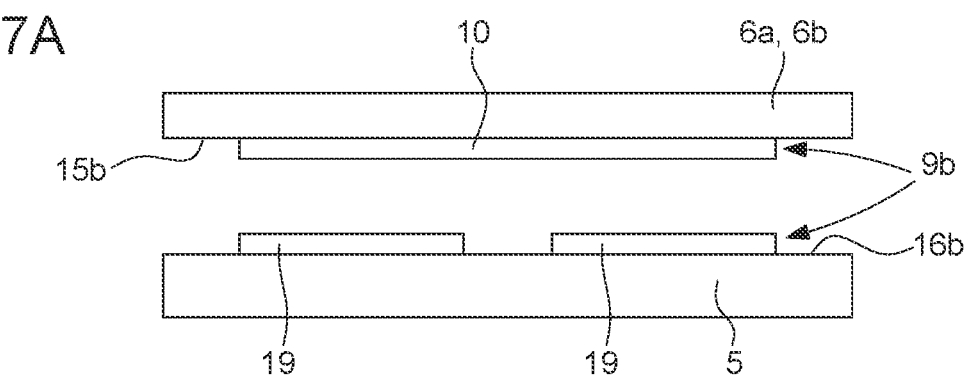
Figure 7B:
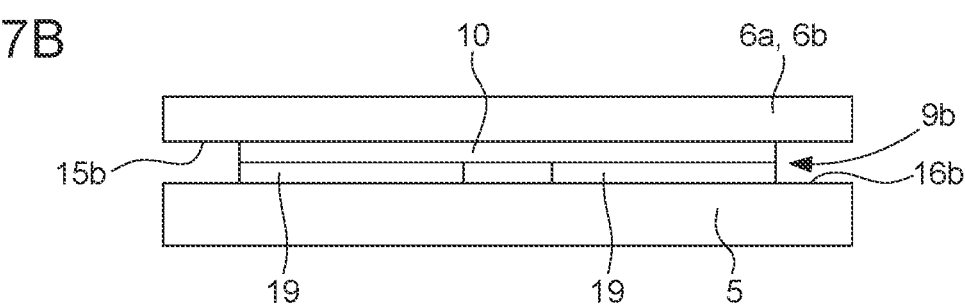

According to FIGS. 7A and 7B, the metal dome switch 9b can be non-tactile. This non-tactile metal dome switch 9b works the same as the tactile metal dome switch 9a except there is no physical response when pressed. In the electronic module 1, the metal dome 10 is fixed to the contact portion 8 of the sealing element 6b of this module 1. In this configuration, when the actionable part is pressed down, the contact portion 8 changes from a state of rest to a state of constraint during which the metal dome 10 is connected with conductive tracks 19 in order to activate/deactivate the module 1. When the pressure is released, the metal dome 10 is disconnected from this conductive tracks 19 and the contact portion 8 returns to its state of rest.

Furthermore, in this electronic module 1, the watertight compartment 4 is included in the first part 3a of the case 2. That watertight compartment 4 is formed by a housing 13 in which the printed circuit board 5 is arranged. This housing 13 comprises the single opening 20 also called "sole opening 20" or "unique opening 20", which is susceptible to be tightly closed by the sealing element 6a, 6b. It can be noted that the sealing element 6a, 6b is configured for tightly closing this opening 20. More specifically, this sealing element 6a, 6b is configured for closing tightly this opening 20 by being fixed to the housing 13 and the printed circuit board 5.

In this context, it can be understood that this compartment 4 is mainly formed by the assembly of the housing 13 with the sealing element 6a, 6b.

Such a housing 13 includes the enclosure 11 to receive the printed circuit board 5. This enclosure 11 is formed/delimited by a bottom and the peripheral inner wall 12 of this housing 13, and also by a flat surface of an area delimited/delineated by the sole/single opening 20.

This housing 13 also includes ribbings 14 to support the printed circuit board 5, which is arranged in its enclosure 11. More specifically, the ribbings 14 extend in this enclosure 11 from the bottom to the opening 20 of the housing 13. That is, the ribbings 14 extend on the surface of the peripheral inner wall 12 from the bottom to that opening 20 of this housing 13. It can be understood that these ribbings 14 are comprised on a surface of the peripheral inner wall 12 of the housing 13.

Each ribbing 14 includes a reception area 17, which is comprised/formed on a flat upper surface 17 of this ribbing 14. This flat upper surface 17 is arranged in view of the opening 20. In other words, this reception area 17 is arranged in view of the surface of the area delimited by the opening 20 and is also parallel or significantly parallel to this surface delineated by this opening 20.

This reception area 17 of each ribbing 14 is configured to cooperate with a peripheral area of the front face 16a of the printed circuit board 5 in order to support this board 5 in the enclosure 11 of the housing 13. This peripheral area of the front face 16a of the printed circuit board 5 can be fixed to the corresponding reception areas 17 of the housing 13 for example by being bonded to these areas and/or clipped and/or screwed and/or crimped.

It can be noted that the distance 22 between each reception area 17 and the surface delineated by the opening 20 is equal or noticeably equal to the thickness 21 of the printed circuit board 5. Thus when the printed circuit board 5 is arranged in the enclosure 11 of the housing 13, a peripheral part of the backside face 16b of the printed circuit board 5 is in a same plane of a part of a surface of an edge 18 of the opening 20 visible on the FIG. 1.

As we discussed before, the watertight compartment 4 includes at least one actionable part reachable or comprised or defined on the external face of the second part of this case 2.

In other words, when this second part is the sealing element 6a, 6b, the actionable part is reachable from the external face of this sealing element 6a, 6b. More specifically, this actionable part is formed by the switch 9a, 9b and a contact portion 8 of the sealing element 6a, 6b. This portion 8 is located above and in contact to the metal dome 10 of the switch 9a, 9b. In this configuration, this portion 8 can be pasted to this metal dome 10. It can be noted that the contact portion 8 covers the metal dome 10, preferably the completeness of this metal dome 10.

When this second part 3b is the complementary element 3b of the first part 3a of the case 2, the actionable part is reachable from the external face of this complementary element 3b. More specifically, this actionable part is formed by the switch 9a, 9b, a contact portion 8 of the sealing element 6a, 6b and a contact portion 7 of the complementary element 3b. This contact portion 7 of the complementary element 3b is included in a flexible zone of the external face of the complementary element 3b. This flexible zone is located above and preferably in contact with the contact portion 8 of the sealing element 6a, 6b. In this configuration, that contact portion 8 of the sealing element 6a, 6b also covers the metal dome 10, preferably the completeness of this metal dome 10.

In this configuration, such actionable part make it possible to activate for example this module 1 that is to say start or stop it, and/or make it possible to select a function of this module 1 for example a tracking function.

In this module 1, the sealing element 6a, 6b is made from a flexible and thin material and comprises an adhesive layer located on all or part of its internal face 15b. More specifically, this sealing element 6a, 6b is a single-sided adhesive tape. In this configuration, when the sealing element 6a, 6b closes the opening 20 of the housing 13, its internal face 15b is pasted to:
the surface of the edge of this opening 20, and/or
the backside face 16b of the printed circuit board 5 or just a part of this backside face 16b for example its peripheral area.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A sealed electronic module comprising at least one actionable part, the module including a case comprising:
   a watertight compartment containing a printed circuit board, said compartment being formed by a housing with only one opening, the housing containing the printed circuit board, and
   a sealing element comprising a flexible element that is fixed directly to the housing and the printed circuit board, and is entirely covering the opening,
   wherein the housing comprises an enclosure delimited by a bottom and a peripheral inner wall, wherein a surface opposite to the bottom is delimited by the opening,
   wherein the housing includes ribbings extending on a surface of the peripheral inner wall from the bottom toward the opening, an extension of the ribbings being configured to arrange in the enclosure a peripheral part of a backside face of the printed circuit board in a same plane as a part of a surface of an edge of the opening, and
   wherein the at least one actionable part is formed by a metal dome switch arranged in the printed circuit board and a part of the sealing element covering the metal dome switch, the metal dome being arranged with a convex side facing the sealing element.

2. The sealed electronic module according to claim 1, wherein the watertight compartment is formed in a state in which the sealing element is assembled to the housing.

3. The sealed electronic module according to claim 1, wherein the sealing element comprises an adhesive on all or part of its internal face.

4. The sealed electronic module according to claim 1, wherein the sealing element is single-sided adhesive tape.

5. The sealed electronic module according to claim 1, wherein the sealing element comprises an internal face pasted to a surface of the edge of the unique opening and a backside face of the printed circuit board.

6. The sealed electronic module according to claim 1, wherein the electronic module is a sealed electronic communication module.

7. The sealed electronic module according the claim 6, wherein the sealed electronic communication module is configured to implement wireless communication technologies, including RFID, NFC and/or Bluetooth technology.

8. An electronic device comprising the sealed electronic module according to claim 1.

9. The sealed electronic module according to claim 1, wherein the enclosure is integrally formed by the bottom and the peripheral inner wall.

10. The sealed electronic module according to claim 9, wherein the metal dome switch is configured to be pressed to enable activation of the module, and
    wherein, based on being pressed, the metal dome switch changes from a dome shape to a flat shape.

11. The sealed electronic module according to claim 10, wherein the metal dome switch comprises a peripheral portion soldered to a first conductive track, wherein a second conductive track is provided on the printed circuit board facing a concave side of the metal dome switch, and wherein, based on being pressed, a middle portion of the metal dome switch connects with the second conductive track when the metal dome switch is in the flat shape.

\* \* \* \* \*